Patented June 22, 1926.

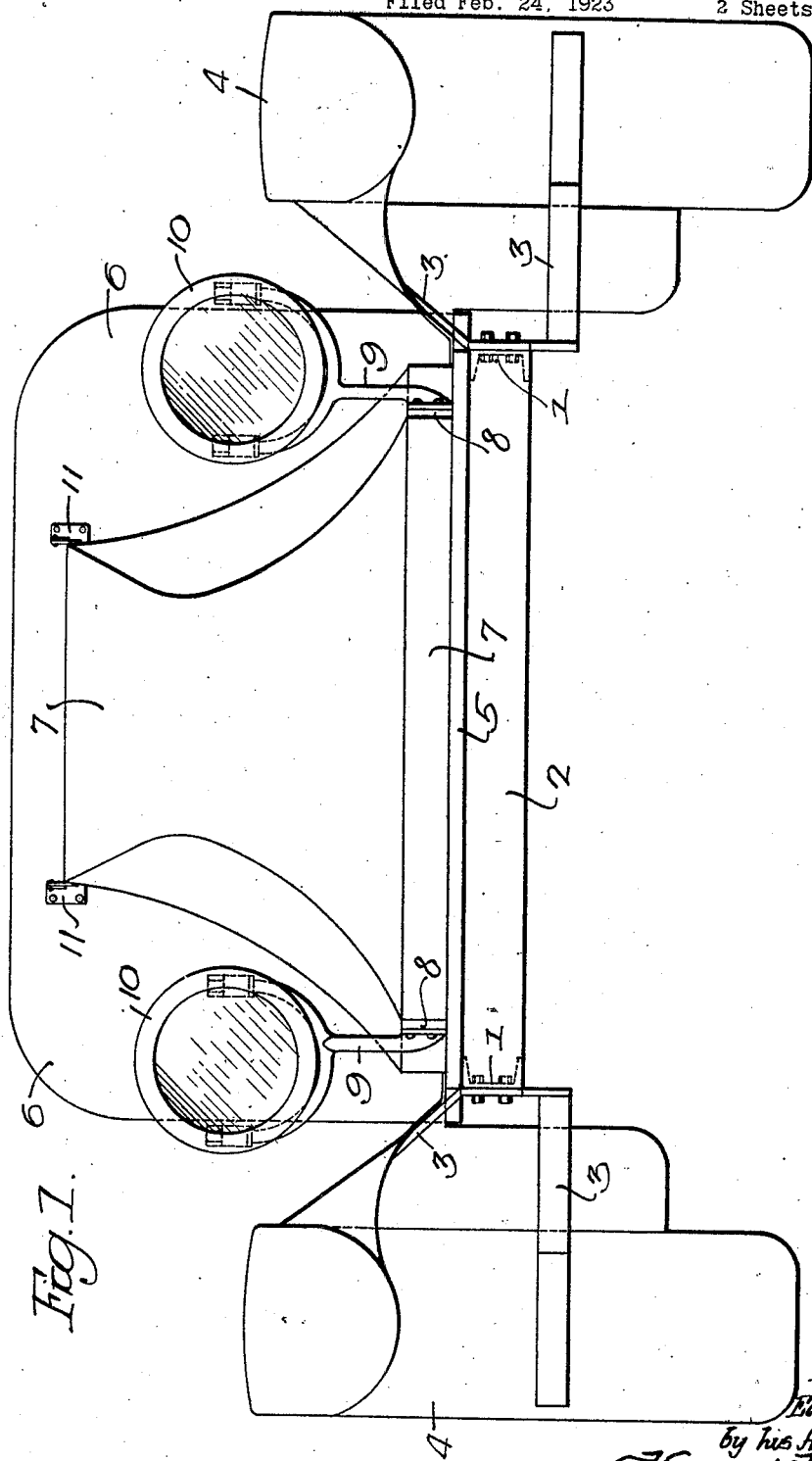

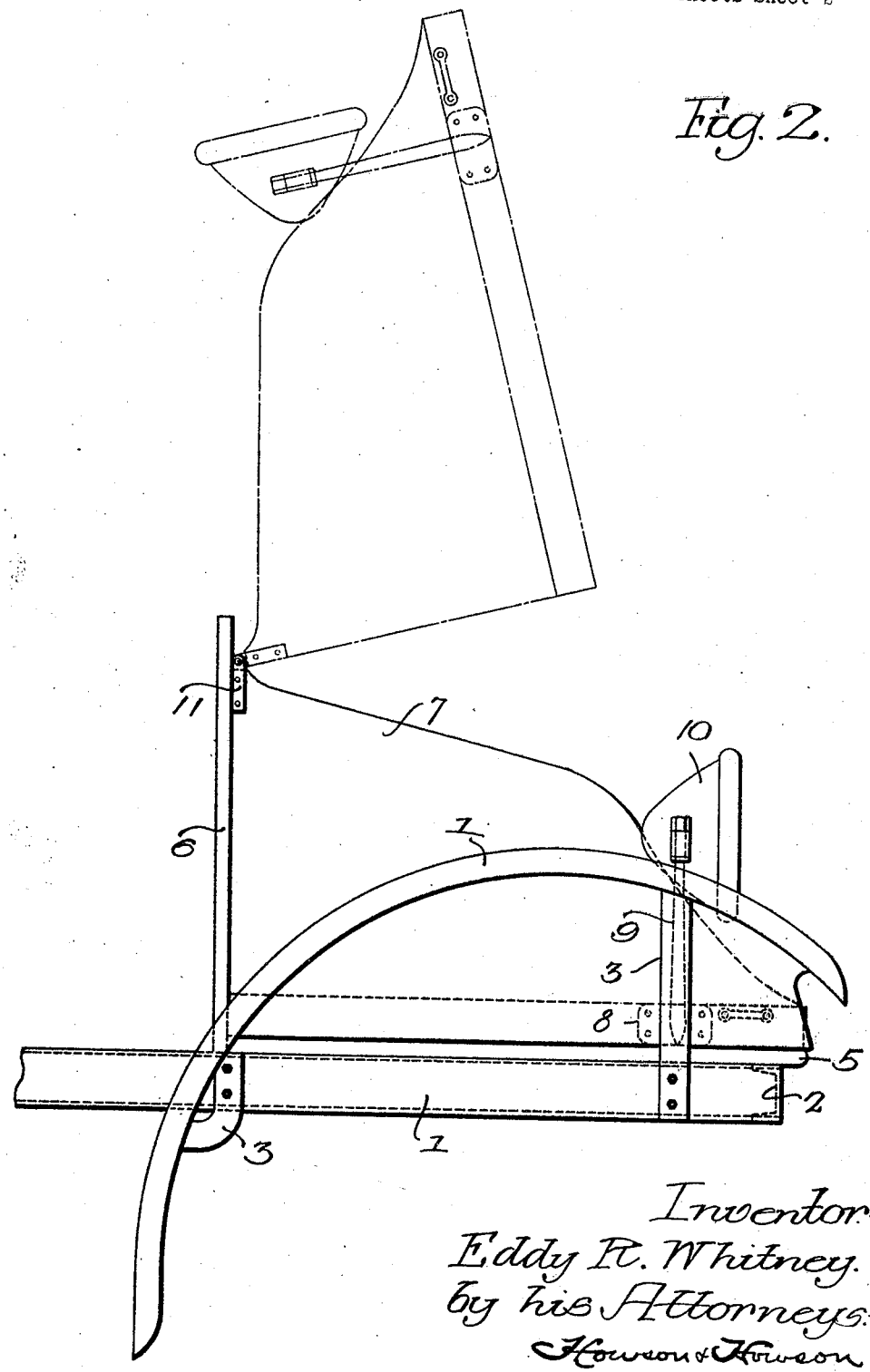

1,590,009

UNITED STATES PATENT OFFICE.

EDDY R. WHITNEY, OF PHILADELPHIA, PENNSYLVANIA, ASSIGNOR TO COMMERCIAL TRUCK COMPANY, OF PHILADELPHIA, PENNSYLVANIA, A CORPORATION OF PENNSYLVANIA.

MOTOR-VEHICLE HOOD.

Application filed February 24, 1923. Serial No. 620,933.

One object of this invention is to provide a novel form of support for the lamps of motor vehicles such as a delivery truck, and the invention more especially contemplates a construction in which said lamps are carried upon the hood of the vehicle in such positions as to be protected from injury but in addition shall be movable with the hood when this is thrown up so as to be out of the way.

These and other advantageous ends I attain as hereinafter set forth, reference being had to the accompanying drawings in which—

Fig. 1 is a front elevation of a portion of a motor vehicle illustrating my invention as applied thereto and, Fig. 2 is a side elevation of the structures shown in Fig. 1, the hood with the lamps being shown by dotted lines in their raised position.

In the above drawings, 1—1 represent the longitudinal or side members of the chassis of a motor vehicle which are connected at the front by cross-member 2. Supported by the frame members at each side of the front of the chassis are suitable brackets 3, each of which supports one of the fenders or wheel guards 4. In the case illustrated a platform 5 is provided on the front portion of the chassis and at the back of this platform is a vertically extending dash 6 having hinged to its upper portion a hood 7 made of sheet metal. This hood in the present instance constitutes a casing sloping upwardly and back from the front of the platform 5 and in accordance with my invention it preferably includes a suitable marginal frame of which portions are indicated at 8—8 in the form of strip or bar material defining the bottom edges of the hood structure and reinforcing the lower edge of the same where it rests upon the top surface of the platform 5.

In accordance with my invention I mount on the frame structure 8 of the hood at each side thereof a lamp bracket 9 which is preferably bifurcated for the reception of any suitable form of lamp or headlight 10. The brackets 9 are so positioned that the lamps are supported well to the rear of the front and of the frame or chassis 1—2—1 so that likelihood of their injury by accidental contact with other objects is considerably lessened. The hood 7 is ordinarily connected to the dash 6 by hinges 11 placed at its rear upper corners so that when the hood is thrown upwardly the lamps are carried with it out of the way to the position indicated by dotted lines in Fig. 2. Any desired instruments or apparatus may be mounted upon the platform 5 under the hood so as to be protected by the same and it will be noted that freest access may be had to said platform when the hood is raised by reason of the fact that the lamps are moved out of the way with it.

I claim—

1. The combination in a motor vehicle, of a frame; a dash mounted on the frame; a hood located in front of the dash and hinged thereto; with lamps secured to the hood at opposite sides thereof so that when the hood is raised the lamps are raised with it, leaving a clear space for access to the mechanism enclosed by the hood.

2. The combination in a motor vehicle, of a frame; wheels supporting the front of the frame; mud guards secured to the frame and extending partially over the front wheels; a dash; a hood hinged to the dash at its rear; lamp brackets mounted on opposite sides of the hood some distance from the front edge thereof; and lamps carried by the brackets and located between the hood and the mud guards.

EDDY R. WHITNEY.